(No Model.)
J. F. BROWN.
ICE CREAM FREEZER.
No. 338,246. Patented Mar. 23, 1886.
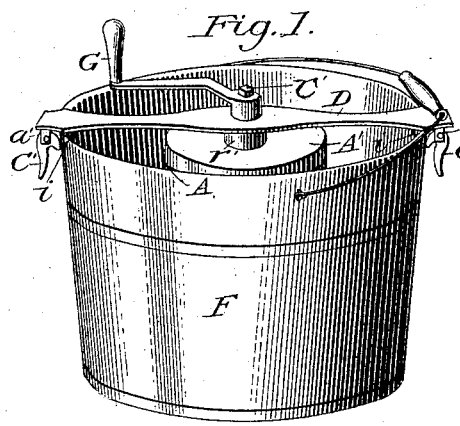
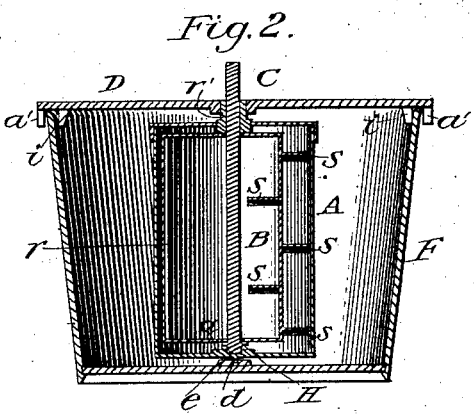
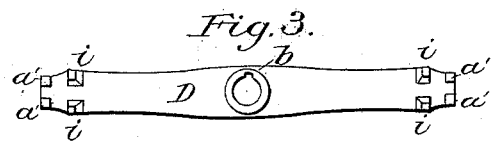
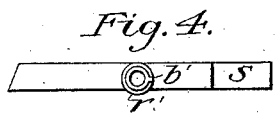
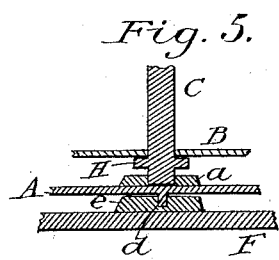
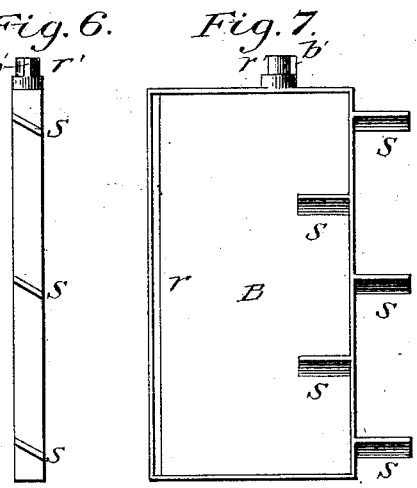
Witnesses:
H. H. Larned
E. P. Sanborn
Inventor:
James F. Brown
By O. V. Fuller, Atty

UNITED STATES PATENT OFFICE.

JAMES F. BROWN, OF LANSING, MICHIGAN.

ICE-CREAM FREEZER.

SPECIFICATION forming part of Letters Patent No. 338,246, dated March 23, 1886.

Application filed June 13, 1885. Serial No. 168,664. (No model.)

*To all whom it may concern:*

Be it known that I, JAMES F. BROWN, a citizen of the United States, residing at Lansing, in the county of Ingham and State of Michigan, have invented a new and useful Ice-Cream Freezer, of which the following is a specification.

My invention relates to ice-cream freezers in which a vertical rotating can is provided with beaters and scraper within; and it consists in the combination of parts, as will be hereinafter more fully set forth.

The objects of my improvements are, first, to provide simple, cheap, and effective ice-cream freezers of small size; second, to provide a facility for rotating the can around stationary beaters and scraper located within said can; and, third, to afford facilities by which the same may be attached to and used in any common wooden pail in which the ice, with salt, is packed around the freezer. I attain the objects by the mechanisms illustrated in the accompanying drawings, in which—

Figure 1 is a view in perspective of the entire machine attached in a common wooden pail. Fig. 2 is a vertical sectional view with the crank G and cam-levers C' C' removed. Fig. 3 is a plan view of the under side of the bar D. Fig. 4 is a top view, and Fig. 7 a side view, of the beater-frame B, beaters $s\,s\,s$, and scraper $r$, enlarged. Fig. 6 is a view in elevation of that which is at the right in Fig. 7; and Fig. 5 is an enlarged sectional view showing the adaptability of the bottom of the wooden pail, the can, the shaft, and the beater-frame.

Similar letters refer to similar parts throughout the several views.

The ice-cream freezer is operated within an ordinary wooden pail, F, (preferably used on account of its adaptability and cheapness,) in which the ice, with salt, is packed around the freezer. The shaft C, to the upper end of which is attached the crank G, turns in the lower bar of the beater-frame and a sleeve, $r'$, secured to the upper bar or arm of said frame. The lower end of said shaft is made square, and is adapted to a correspondingly square socket in bearing $a$, attached to the bottom of can A, and thereby the can is made to turn with the shaft, said can having on the bottom a pivot, $d$, that turns in bearing $e$, attached to the bottom of wooden pail F. The beater-frame B, in which the shaft C turns, rests upon the collar H, attached to the shaft.

The sleeve $r'$, previously referred to, is not of the same size on the outside throughout its length. The upper half of its length, which is made smaller, extends through the bar D, and is provided with a rib or feather, $b'$, on one side, adapted to a corresponding notch, $b$, in said bar D, which is secured to pail F by means of the cam-levers C' C', and by this arrangement the beater-frame, with the beaters $s\,s\,s$ and scraper $r$ attached, is held stationary, while the can A is rotated.

To the bar D are attached studs $i\,i$, which operate against the inside of the pail F and resist the action of the cam-levers secured to the studs $a'\,a'$ upon the outside. The lower and upper bars or arms of the beater-frame, in which the shaft C turns, extend out from the shaft on one side nearly to the side of the can, and are connected by a perpendicular bar, to which is attached a wooden scraper. Upon the opposite side these bars or arms extend out only half-way from the shaft to the can, and are also connected by a bar, to which are attached alternately on each side the beaters $s\,s\,s$.

The beater-frame with beaters $s\,s\,s$ and sleeve $r$ attached are all made in one piece. The shaft C, with its collar H, pivot $d$, and bearings $e$ and $a$, are all of cast-iron, made malleable and tinned. The can A, which is held in place at the bottom by the pivot $d$, is also held in its relative position at the top by the cover A', which is adapted to and turns on the larger part of sleeve $r'$.

I am aware that stationary scraper and beaters have been used in connection with ice-cream freezers, and do not claim such, broadly; but What I do claim, and desire to secure by Letters Patent, is—

1. The combination, in an ice-cream freezer, of the beater-frame B, beaters $s\,s\,s$, and scraper attached, sleeve $r'$, secured to the upper bar or arm, and having rib or feather $b'$, with bar D, adapted to said sleeve, all substantially as described, and for the purpose specified.

2. In an ice-cream freezer, the combination of the stationary beater-frame, having beaters $s\ s\ s$ and scraper $r$ attached, sleeve $r'$, secured to the upper bar of said frame and having feather $b'$, with bar D, adapted to said sleeve, and having on each end studs $i\ i$ and $a'\ a'$, to the latter of which are attached by a pin cam-levers C' C', all as described, and for the purpose specified.

3. The combination, in an ice-cream freezer, of the beater-frame B, beaters $s\ s\ s$ and scraper $r$ attached, sleeve $r'$, secured to the upper bar or arm of said frame, with shaft C, which turns in the lower bar or arm, and sleeve $r'$, secured to the upper bar or arm, and having collar H near the lower end, as shown, and for the purpose specified.

4. The combination, in an ice-cream freezer, of the shaft C, having collar H attached, and which turns in the lower bar, and sleeve $r'$, secured to the upper bar of a stationary beater-frame, and having the lower end made square, with the can A, on the bottom of which is secured the bearing $a$, having a square socket adapted to the lower end of shaft C, and attached to the under side of said bottom pivot, $d$, which turns in bearing $e$, secured to the bottom of wooden pail F, all substantially as set forth.

5. In an ice-cream freezer, the rotating can A, pivot $d$, attached to the bottom of said can, and the cover A', having a central opening through, with the sleeve $r'$, the larger part of which is adapted to said cover, all substantially as shown, described, and for the purpose specified.

JAMES F. BROWN.

Witnesses:
M. R. TAYLOR,
ASAHEL CHASE.